United States Patent [19]
Russ, Sr.

[11] 3,747,994
[45] July 24, 1973

[54] EDGE RIB FOR ENDLESS TRACK

[75] Inventor: Paul E. Russ, Sr., Englewood, Colo.

[73] Assignee: The Gates Rubber Company, Denver, Colo.

[22] Filed: Mar. 31, 1971

[21] Appl. No.: 129,834

[52] U.S. Cl. .......................................... 305/35 EB
[51] Int. Cl. ............................................ B62d 55/24
[58] Field of Search .................. 305/35 EB, 38, 37; 180/5 R

[56] References Cited
UNITED STATES PATENTS

| | | | |
|---|---|---|---|
| 3,582,155 | 6/1971 | Marier | 305/38 |
| 3,205,023 | 9/1965 | Nodwell | 305/35 EB |
| 2,476,460 | 7/1949 | Smith | 305/38 X |
| 1,460,656 | 7/1923 | Kegresse | 305/35 EB |
| 3,582,154 | 6/1971 | Russ | 305/38 |
| 3,140,752 | 7/1964 | Serrahima | 180/5 R |

FOREIGN PATENTS OR APPLICATIONS

| | | | |
|---|---|---|---|
| 489,062 | 12/1952 | Canada | 305/35 EB |
| 833,436 | 2/1970 | Canada | 305/38 |

Primary Examiner—Richard J. Johnson
Attorney—Raymond Fink, H. W. Oberg, Jr. and Curtis H. Castleman, Jr.

[57] ABSTRACT

An edge rib for flexible and endless tracks of the polymeric type. The edge rib extends around each circumferential edge of the track and has a plurality of transverse grooves formed therein.

5 Claims, 2 Drawing Figures

Patented July 24, 1973

3,747,994

INVENTOR:
PAUL E. RUSS SR.
BY H. H. Oberg Jr
ATTORNEY

EDGE RIB FOR ENDLESS TRACK

BACKGROUND OF THE INVENTION

The invention relates to wheel substitutes for land vehicles, but more particularly, the invention relates to polymeric tracks or treads having an edge rib disposed at each circumferential edge.

It is normal practice to form a solid rib around each circumferential edge of molded or cast polymeric tracks of the flexible and endless type — such as used on snowmobiles or all-terrain vehicles. The rib strengthens the edge portion of the track. The rib may extend radially inward, radially outward, or both.

Although prior art edge ribs provide desirable strength and transverse stiffness to the edge portion of a polymeric track, there are several problems associated with their use. The solid edge rib somewhat increases longitudinal rigidity of the edge portion of the track which is undersirable as the track must be flexible so that it may be trained around small diameter wheels of a suspension system. The solid edge rib is also susceptible to cracking because of high stresses induced by flexing. The bulk of the edge rib and flexing thereof make it especially susceptible to cracking at temperatures below zero degrees Fahrenheit. The bulk of the edge rib makes it difficult to locate a textile reinforcement along a neutral bending axis during the polymeric track fabrication process. The reinforcement has a tendency to "float" or be displaced from the neutral bending axis. Once the reinforcement is displaced, the flexural rigidity of the edge rib is increased in at least one direction. Increased rigidity may enhance or promote edge rib cracking.

SUMMARY OF THE INVENTION

An edge rib is provided which extends around the circumferential edges of an endless track of the cast or molded polymeric type. The edge rib may extend from the edges radially inward, radially outward or both. A plurality of generally transversely oriented grooves are formed in the radially extending portion of the edge rib. The grooves advantageously enhance longitudinal flexibility of the edge portion of the track without appreciably impairing transverse rigidity.

It is an object of the invention to provide a polymeric type track having an edge rib which is not susceptible to propagating cracks when repeatedly flexed.

Another object of the invention is to provide an edge rib for a polymeric type track which rib enhances traction of the track.

Another object of the invention is to provide an edge rib for a polymeric type endless track where the shape of the rib promotes proper location of a reinforcement therewithin during the fabrication process of the track.

These and other objects or advantages will become more apparent by reviewing the drawings and description thereof wherein.

DESCRIPTION OF PREFERRED EMBODIMENT

Figure 1:
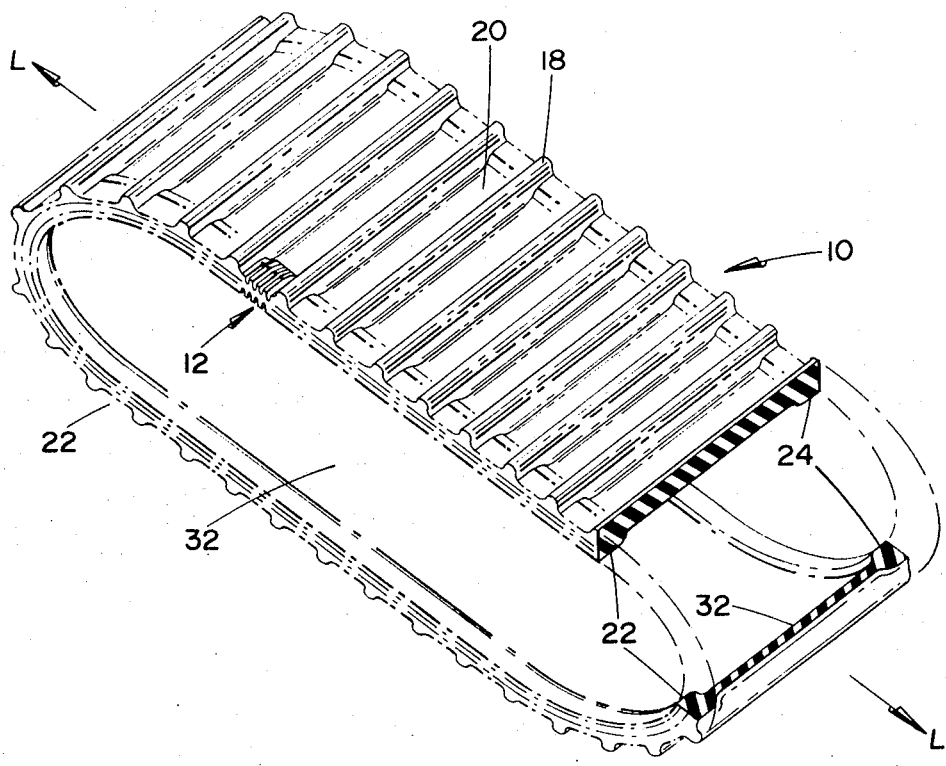
FIG. 1 is an isometric view of a polymeric track including the edge rib of the invention.
Figure 2:
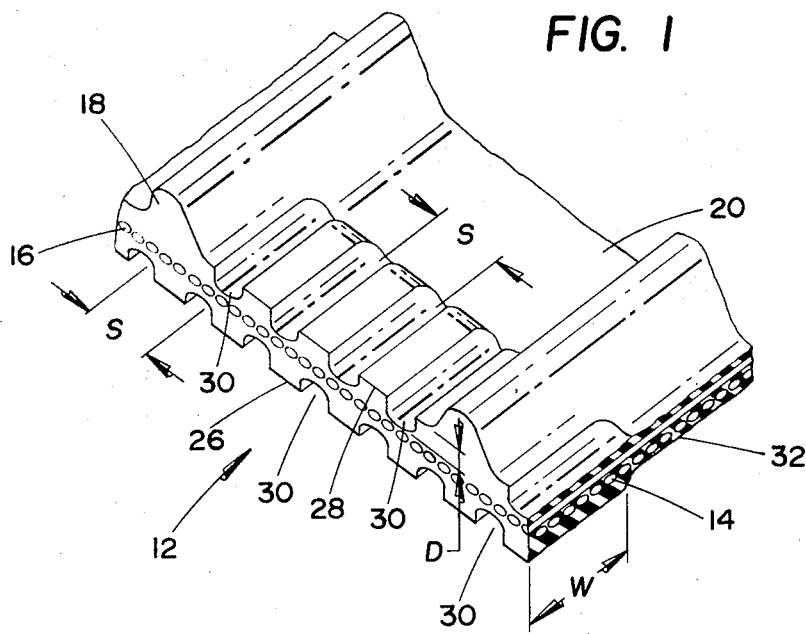
FIG. 2 is an enlarged view of FIG. 1 showing a cutaway and partial section of the edge rib.

Referring to the drawings, a polymeric track 10 is provided having an edge rib 12 of the invention. By known processes, the track is fabricated having a longitudinal 14 and transverse 16 reinforcement disposed therein. A tread 18 is formed on the radially outer surface 20 of the track. The edge rib 12 of the invention extends circumferentially around each edge portion 22, 24 as a raised projection from the track. The rib 12 may have any desired width W to provide a desired edge stiffness and the rib 12 may optionally extend radially inward 26, radially outward 28, or both radially inward and outward 26, 28. Preferably, the rib does not radially extend an amount greater than the upraised portion of the tread 18. A plurality of generally transversely oriented grooves 30 extend across the width of the rib. The grooves may have any desired shape but preferably, the grooves have a generally rounded or radially curved bottom for stress-relieving purposes. A rib which extends both radially inward and outward as shown in FIG. 2, may have two different groove spacings. That is, the longitudinal spacing of the radially inward grooves may be different from that of the radially outward grooves. Preferably, the longitudinal spacing S of both sets of grooves are generally the same, but the grooves may be aligned with or offset from each other. It is desirable to have the radially outer grooves offset from the radially inner grooves by an amount essentially equal to half the longitudinal spacings. Offsetting prevents grooves from being aligned directly opposite each other. When the grooves are oppositely aligned, the thickness of the edge rib is minimum. The grooves 30 may have any desired depth D. However, it is preferred to limit the grooves to a depth which is not below the inner 32 or outer 20 surface of the track.

One of the salient features of the grooves is that they aid in locating the reinforcements 14, 16 to a proper position within the edge rib. During the manufacturing process, whether it be casting or molding, a plurality of male members extend from a mold and into the edge rib to displace polymeric material and define a plurality of grooves. The plurality of male members define a surface for aligning and holding the reinforcement into position during the track fabrication process. In the absence of the male members, any reinforcement in the edge rib would be unrestrained and free to be displaced to an undesirable position within the edge rib. Should the reinforcement be displaced, the bending characteristics of the edge rib are affected. Bending must take place about the reinforcement. When the reinforcement is positioned toward one side of the edge rib, the opposite, and thick, side of the edge rib is subjected to large bending stresses. The stresses may be of sufficient magnitude to cause cracking.

When a edge rib 12 of the invention is used in combination with an endless polymeric track 10, certain advantages are realized. The edge rib provides the prior art features of: additional material at the edge of the track for improved wear life and strength; and improved transverse traction. In addition, the edge rib provides improved longitudinal flexibility.

The improved flexibility allows the edge portion of the track to be easily bent as the track is trained around small diameter wheels of a vehicle suspension system. Also, the edge rib permits the edge portion to bend and conform to irregular terrain over which the track may be used. A salient and perhaps secondary feature is that the grooves of the edge rib provide the track with improved longitudinal traction. Perhaps the most important advantage of the invention is that the above discussed features are provided while the problem of cracks propagating from the edge rib are significantly reduced or eliminated, especially at temperatures below zero degrees Fahrenheit.

The foregoing detailed description is made for purpose of illustration only and is not intended to limit the scope of the invention which is to be determined from the appended claims.

What is claimed is:

1. In an integrally molded flexible track having an outer surface, radially inner and outer circumferential edges, an embeded reinforcement and a tread including a plurality of spaced tread ribs having depths formed and oriented generally transversely on the outer surface, the improvement with comprises:

an upraised edge rib extending around the radially outer circumferential edges of the track, said edge rib having a plurality of spaced apart grooves with curved bottom surfaces oriented generally parallel with the ribs and disposed in a plane generally coplanar with the outer surface of the track, said edge rib having a width that is less than the tread rib spacing, and a height that is less than the rib width and the tread rib height; whereby the embedded reinforcement is positioned juxtaposed the grooved bottom surfaces.

2. A track as set forth in claim 1 wherein said edge rib projects radially outward from the outer surface at the circumferential edges an amount less than the depth of the tread.

3. A track as set forth in claim 1 wherein the grooves have a depth defined by bottom surfaces which are generally equal to the outer surface of the track.

4. In a flexible track having generally planar inner outer surfaces radially inner and outer circumferential edges, and a tread having depth formed on the outer surface, the improvement which comprises:

four upraised edge ribs extending around the radially inner and outer circumferential edges of the track, said edge ribs having a plurality of spaced apart grooves having bottom surfaces disposed in planes generally coplanar with the inner and outer surfaces of the track, said grooves oriented generally transversely in relation to the track and generally parallel with the ribs.

5. A track as set forth in claim 4 wherein the spacing of the grooves of said radially outer edge ribs are offset from the spacing of the grooves of said radially inner ribs.

* * * * *